United States Patent
Geib et al.

(10) Patent No.: US 6,533,242 B2
(45) Date of Patent: Mar. 18, 2003

(54) SHAFT HAVING VARIABLE COMPLIANCE TO A BUSHING

(75) Inventors: Todd P. Geib, Fairport, NY (US); Craig D. Smith, Penfield, NY (US)

(73) Assignee: Delphi Technologies, Inc., Troy, MI (US)

(*) Notice: Subject to any disclaimer, the term of this patent is extended or adjusted under 35 U.S.C. 154(b) by 36 days.

(21) Appl. No.: 09/805,344

(22) Filed: Mar. 13, 2001

(65) Prior Publication Data
US 2002/0130291 A1 Sep. 19, 2002

(51) Int. Cl.$^7$ .............................................. F16K 41/00
(52) U.S. Cl. .......................................... 251/214; 251/86
(58) Field of Search .................... 251/84–88; 123/188.1, 123/188.2, 188.4, 188.16; 384/57

(56) References Cited

U.S. PATENT DOCUMENTS

| | | | | |
|---|---|---|---|---|
| 1,603,835 A | * | 10/1926 | Boynton | 251/86 X |
| 2,295,208 A | | 9/1942 | Grove | |
| 2,873,760 A | * | 2/1959 | Safford | 251/86 X |
| 2,892,608 A | * | 6/1959 | Collins | 251/86 X |
| 3,472,481 A | | 10/1969 | Spies, Jr. | |
| 3,574,311 A | * | 4/1971 | Fairbanks | 251/86 X |
| 3,820,755 A | | 6/1974 | Greenwood et al. | |
| 3,842,852 A | * | 10/1974 | Bair | 251/214 X |
| 3,881,459 A | * | 5/1975 | Gaetcke | 123/188.1 |
| 3,897,042 A | | 7/1975 | Kachergis | |
| 4,060,193 A | | 11/1977 | Foller | |
| 4,685,653 A | * | 8/1987 | Kaltenthaler et al. | 251/284 X |
| 5,503,123 A | | 4/1996 | Carter | |
| 5,673,897 A | * | 10/1997 | Crochet et al. | 251/214 X |

* cited by examiner

Primary Examiner—Gene Mancene
Assistant Examiner—Eric Keasel
(74) Attorney, Agent, or Firm—Patrick M. Griffin

(57) ABSTRACT

A system for seating a head of a valve shaft that is received within a first axial bore in a primary bushing includes a second bushing having a second axial bore. The second axial bore has a second bore diameter, and is substantially concentric relative to the first axial bore. The valve shaft has a first shaft portion and a second shaft portion. The first portion has a first portion diameter, and the second portion has a second portion diameter. The first portion diameter is a predetermined amount less than the second bore diameter, whereas the second portion diameter is substantially equal to the second bore diameter. The first shaft portion is received within the second axial bore when the valve shaft is in the closed position. The second shaft portion is received within the second axial bore when the valve shaft is in the open position.

8 Claims, 6 Drawing Sheets

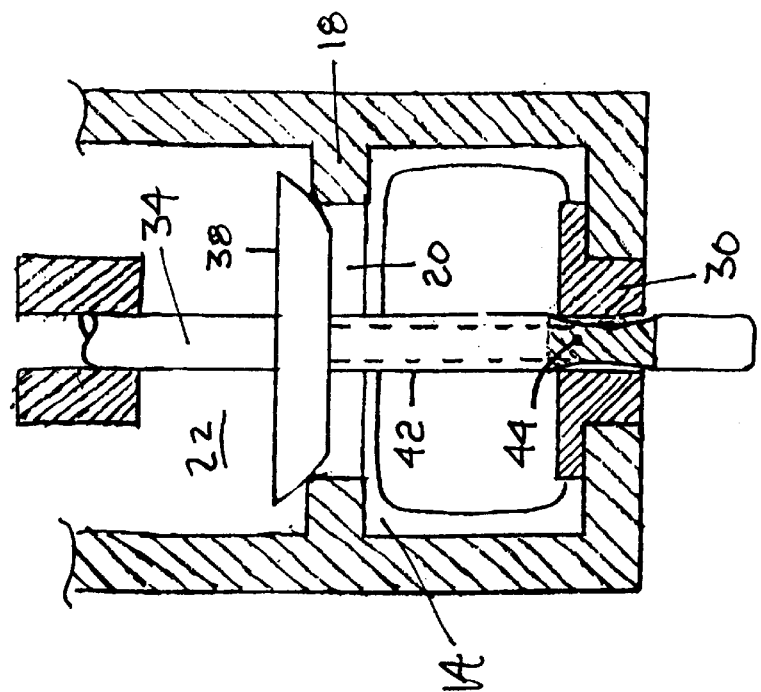
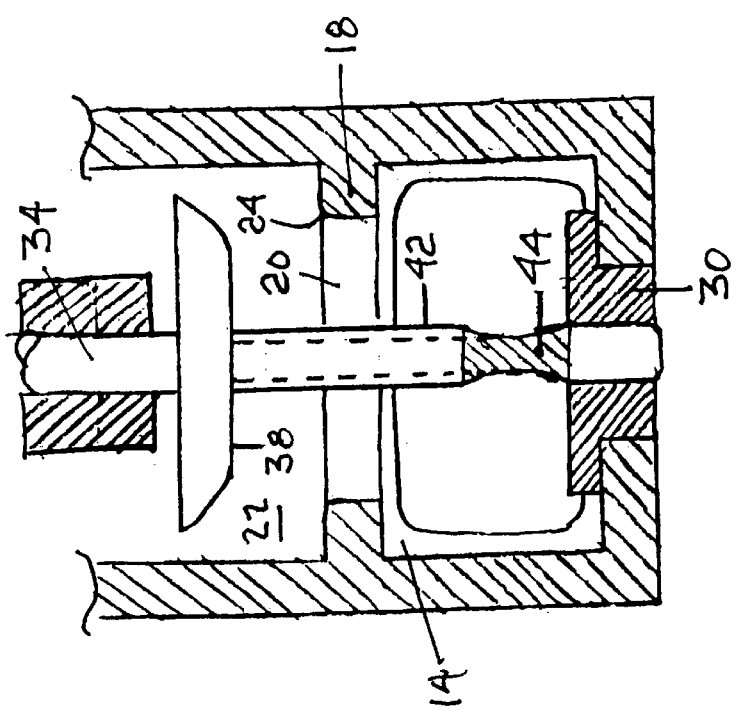

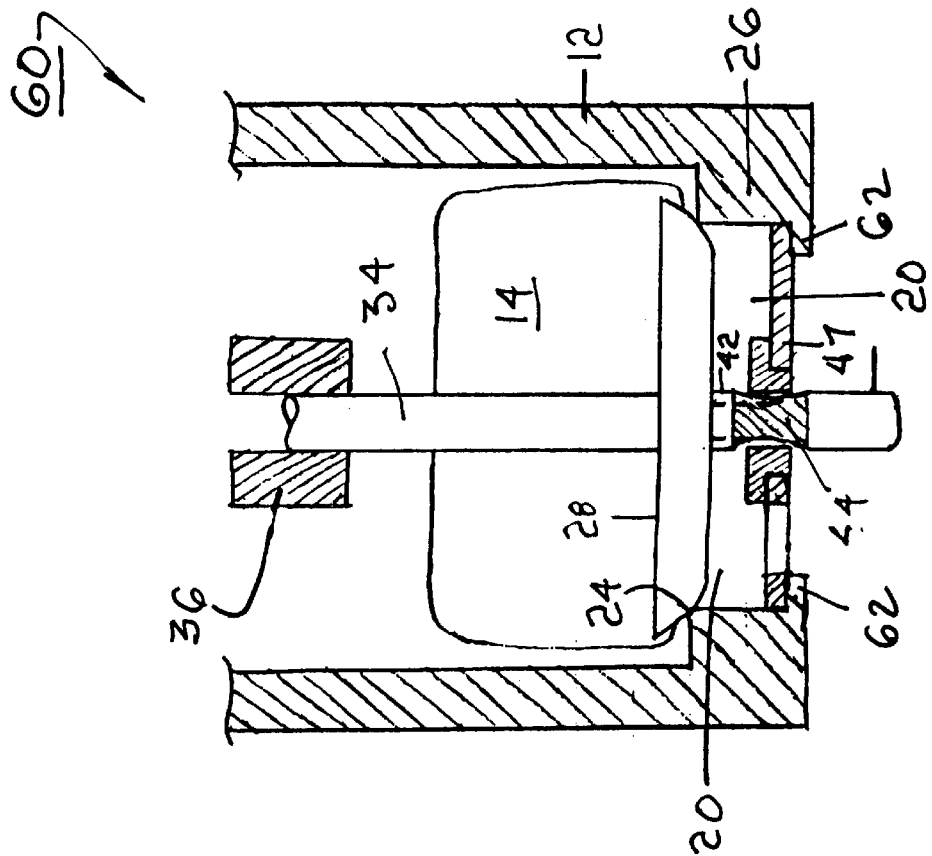
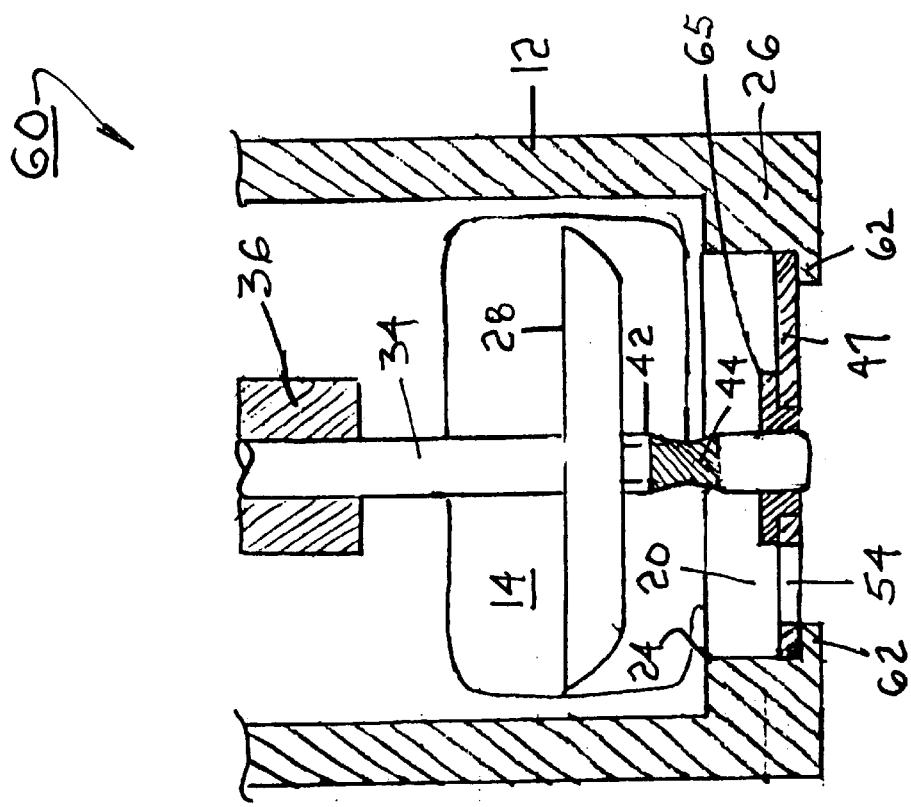

SHAFT HAVING VARIABLE COMPLIANCE TO A BUSHING

TECHNICAL FIELD

The present invention is related to shafts supported for motion by bushings; more particularly, to a shaft radially supported by a bushing for axial motion therethrough; and most particularly, to a shaft which is radially non-compliant to a bushing over a first portion of its length and which is radially compliant over a second portion thereof. A shaft in accordance with the invention is especially useful in centering a pintle of a pintle-type valve over most of the open portion of the pintle stroke while also permitting a valve head disposed on the pintle shaft to seek the corresponding valve seat in closing without constraints from axial misalignment of the shaft bushing.

BACKGROUND OF THE INVENTION

Bushings are well known for use in guiding shafts during axial and/or rotary motion. Typically, a shaft is borne relatively snugly in a bushing to minimize radial runout of the shaft during its axial stroke or rotation. As such, the bushing is the centering element for the shaft.

In pintle-type valves, also known in the art as poppet valves, a pintle shaft supportive of a valve head is oscillatable axially to cause the head to be engaged with, and disengaged from, a valve seat to prohibit and permit, respectively, flow of material through the valve. In some valves, the pintle shaft extends through and is supported by a single main bearing or bushing in a wall of the valve housing opposite to the seat. In all valve-open positions, the pintle shaft and valve head, therefore, are cantilevered from the main bushing. If flow of material through the valve is especially turbulent or high velocity, side-loading forces on the pintle may cause it to vibrate, which can accelerate wear of the bushing, and may even permanently distort the pintle, leading to valve closing failure.

In such high-demand applications, it is known to provide a secondary shaft bushing for additional radial support of the pintle shaft. Such a secondary bushing may be provided either along the pintle shaft at a location above the extreme travel of the valve head, or along a shaft extension beyond the valve head.

A secondary support, however, presents a serious dilemma for manufacture and use of such a valve. On the one hand, for proper actuation, it is highly desirable that the valve head be free to mate with the valve seat; thus the shaft desirably has substantial radial runout in the bushing to prevent radial constraint of the shaft and head due to non-coaxial misalignment of the valve seat and secondary bushing in manufacturing or due to thermal distortions. On the other hand, to prevent vibration and deformation of the pintle shaft, it is highly desirable that the valve have minimal radial runout in the bushing.

It is a principal object of the present invention to provide means whereby a pintle shaft has minimal radial runout to prevent shaft vibration and also permits free seating of a valve head in a valve seat.

SUMMARY OF THE INVENTION

Briefly described, a pintle-type valve has a pintle shaft radially supported by a primary bushing in a first wall of the valve's housing. The shaft extends through a chamber in the housing and supports a valve head near the distal end of the shaft for matably closing with a valve seat surrounding a port in a second wall of the housing. The shaft is provided with means for cooperating with a secondary bushing. The shaft is radially and non-compliantly supported by the secondary bushing through the major portion of the valve's axial stroke. However, that portion of the shaft extension which is within the secondary bushing just as the valve closes is provided with a reduced diameter, such that the shaft extension then is not radially supported by the bushing and the valve head may freely self-center on the valve seat.

BRIEF DESCRIPTION OF THE DRAWINGS

These and other features and advantages of the invention will be more fully understood and appreciated from the following description of certain exemplary embodiments of the invention taken together with the accompanying drawings, in which:

FIG. 5 is a schematic cross-sectional elevational view of a third embodiment of a poppet valve having a shaft with variable compliance to a bushing, showing the valve in the open position with the shaft radially non-compliant in the bushing;

FIG. 6 is a view like that shown in FIG. 5, but showing the valve in the closed position with the shaft radially compliant in the bushing;

FIG. 7 is a schematic cross-sectional elevational view of a fourth embodiment of a poppet valve having a shaft with variable compliance to a bushing, showing the valve in the open position with the shaft radially non-compliant in the bushing;

FIG. 8 is a view like that shown in FIG. 7, but showing the valve in the closed position with the shaft radially compliant in the bushing;

DESCRIPTION OF THE PREFERRED EMBODIMENTS

Figure 1:
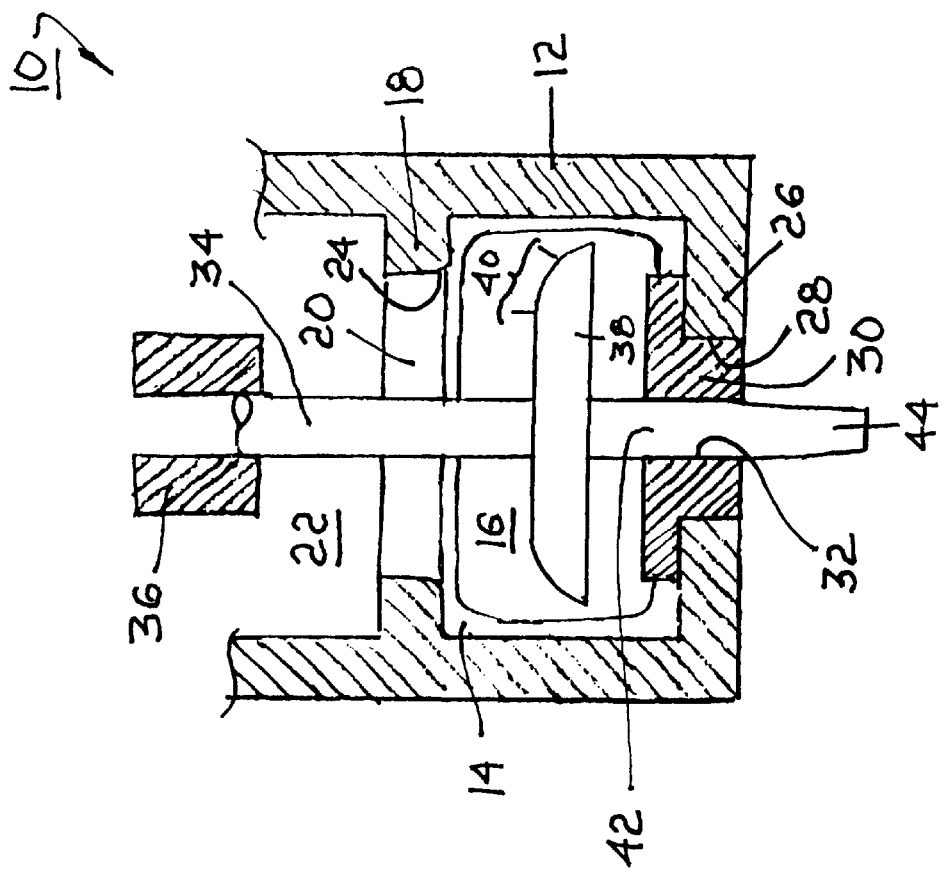
FIG. 1 is a schematic cross-sectional elevational view of a portion of a first embodiment of a poppet valve having a shaft with variable compliance to a secondary shaft bushing in accordance with the invention, showing the valve in the closed position with the shaft radially compliant in the bushing.
Figure 2:
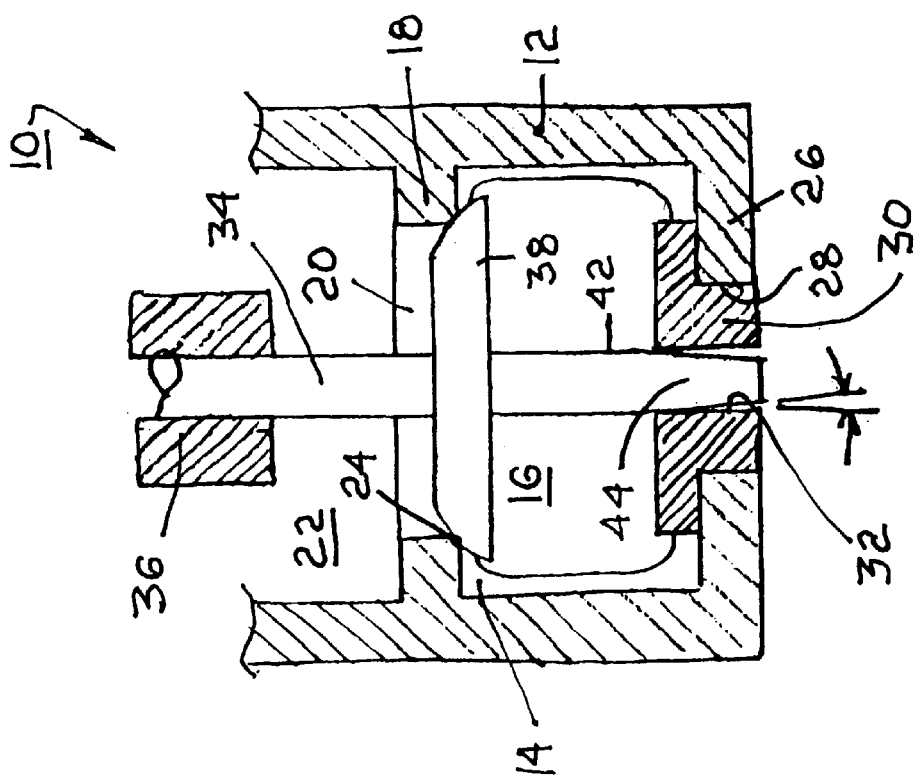
FIG. 2 is a view like that shown in FIG. 1, but showing the valve in the open position with the shaft radially non-compliant in the secondary bushing.

Referring to FIGS. 1 and 2, a first embodiment 10 of a poppet valve in accordance with the invention has a portion of a valve body 12 having a first chamber 14 containing a flow passage 16. A first wall 18 of chamber 14 has a first port 20 therethrough opening into a second chamber 22. Port 20 is provided with a circular valve seat 24 at the entrance thereof from chamber 14. Second wall 26 of chamber 14 has a second port 28 therethrough for receiving a secondary shaft bushing 30 having an axial bore 32. A pintle shaft 34 extends axially through a primary shaft bushing 36 disposed in valve body 12 (portion not shown for simplicity), and through port 20, seat 24, chamber 14 and secondary shaft bushing 30. Disposed on shaft 34 in chamber 14 is a conventional circular valve head 38 having an angled or rounded periphery 40 for sealably mating with valve seat 24 to control flow between chambers 14 and 22 via axial movement of shaft 34 in known fashion.

The portion of shaft 34 extending from head 38 through secondary bushing 30 is referred to herein as a pintle shaft extension 42. Shaft extension 42 preferably is formed having a diameter substantially identical to the inner diameter of bushing 30 such that shaft extension 42 is closely supported radially, as shown in FIG. 2. In such a relationship, the shaft is said to be "radially non-compliant." The purpose in radially supporting the pintle shaft with both a primary bushing and a secondary bushing is to more ruggedly support the shaft against vibration and deformation by turbulence when the valve is open, by eliminating the cantilever of the shaft which would exist if the shaft did not extend beyond the valve head, as described above.

To permit valve head 38 to be self-centering in valve seat 24, shaft extension 42 is provided with a reduced diameter portion 44, which in embodiment 10 takes the form of a linear taper. Portion 44 is preferably slightly longer than the axial length of bushing 30 such that as the valve closes, portion 44 passes out of radial contact with bushing 30. The shaft extension is then said to be "radially compliant," meaning that the radial position of the shaft and of head 38 is no longer governed by bushing 30. In reverse, as the valve begins to open, the shaft immediately re-establishes radial contact with the bushing and is guided and radially supported thereby through the remaining stroke of the pintle shaft.

Figure 3:
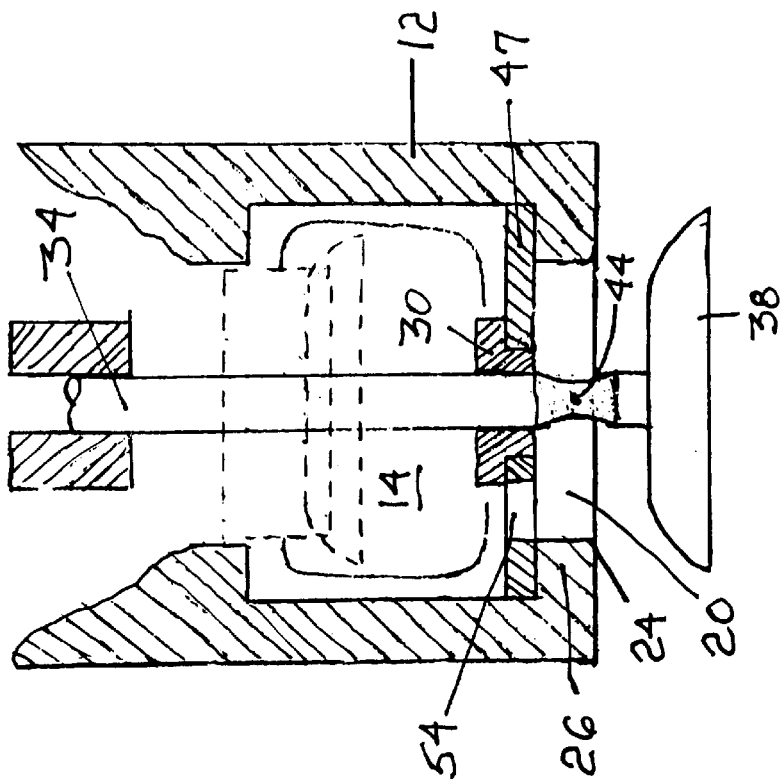
FIG. 3 is a schematic cross-sectional elevational view of a second embodiment of a poppet valve having a shaft with variable compliance to a secondary shaft bushing, showing the valve in the closed position with the shaft radially compliant in the bushing.
Figure 4:
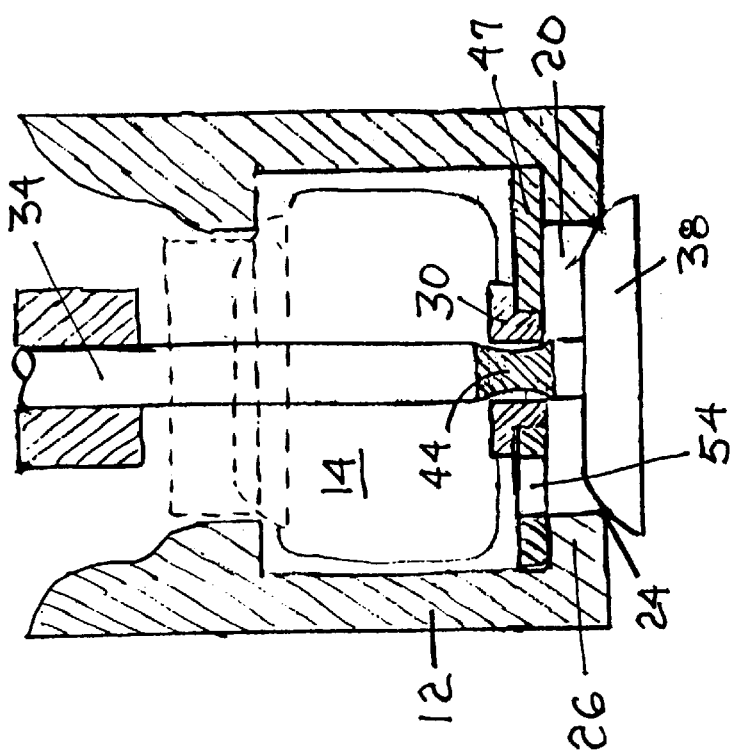
FIG. 4 is a view like that shown in FIG. 3, but showing the valve in the open position with the shaft radially non-compliant in the bushing.
Figure 10:
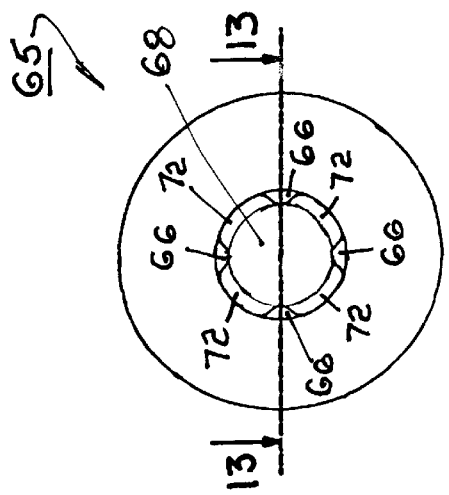
FIG. 10 is a plan view of a secondary shaft bearing holder, also known as a "spider;"

Referring to FIGS. 3 and 4, the valve body 12 in a second embodiment 46 is similar to that in embodiment 10 except that the port 20 exiting chamber 14 is through second wall 26, valve seat 24 is disposed outside of chamber 14, valve head 38 mates with seat 24 outside of chamber 14, and there is no pintle shaft extension. Pintle shaft 34 is secondarily supported in accordance with the invention by providing a secondary shaft bearing 30 in a bearing holder 47 disposed within chamber 14 against an inner surface of wall 26. A suitable bearing holder, also known in the art as a "spider," is shown in FIG. 10. Holder 47 has a rim 48 and a hub 50 connected by a plurality of ribs 52 to rim 48. Flow passages 54 between ribs 52 permit flow of material through port 20. Hub 50 has an axial bore 56 for receiving and retaining a secondary shaft bushing 30.

Pintle shaft 34 is full-fitting in bushing 30 except for a reduced-diameter portion 44, identical in function to portion 44 in embodiment 10 and disposed axially on shaft 34 such that as the valve closes, portion 44 passes out of radial contact with bushing 30. In embodiment 46, reduced-diameter portion 44 is shown as being "necked down" or "hour-glass" shaped to provide in effect a chamfered entrance of the shaft into the bearing bore. Preferably, the diameter of portion 44 is reduced, at its minimum, over the diameter of the remaining portion of shaft 34, by an amount typically about 1/20th the axial length of bore 32.

Referring to FIGS. 5 and 6, a third embodiment 58 of a valve in accordance with the invention has port 20 in valve wall 18, as in embodiment 10. However, seat 24 is disposed at the entrance of port 20 into chamber 22; thus valve head 38 is also disposed on shaft 34 in chamber 22. In this embodiment, pintle shaft extension 42 extends through chamber 14 and is radially supported in a secondary shaft bushing 30 in fashion identical to that in embodiment 10 (FIGS. 1 and 2). The hour-glass form of reduced-diameter portion 44 is shown in embodiment 58.

Referring to FIGS. 7 and 8, a fourth embodiment 60 in accordance with the invention has port 20 formed in wall 26 and has seat 24 and head 38 disposed within chamber 14. Bearing holder 47 is disposed on a step 62 in port 20 to permit flow of material through port 20. A reduced-diameter portion 44 is provided on pintle shaft extension 42 such that the extension is full fitting and non-compliant radially in bushing 65 while the valve is open (FIG. 7).

Figure 9:
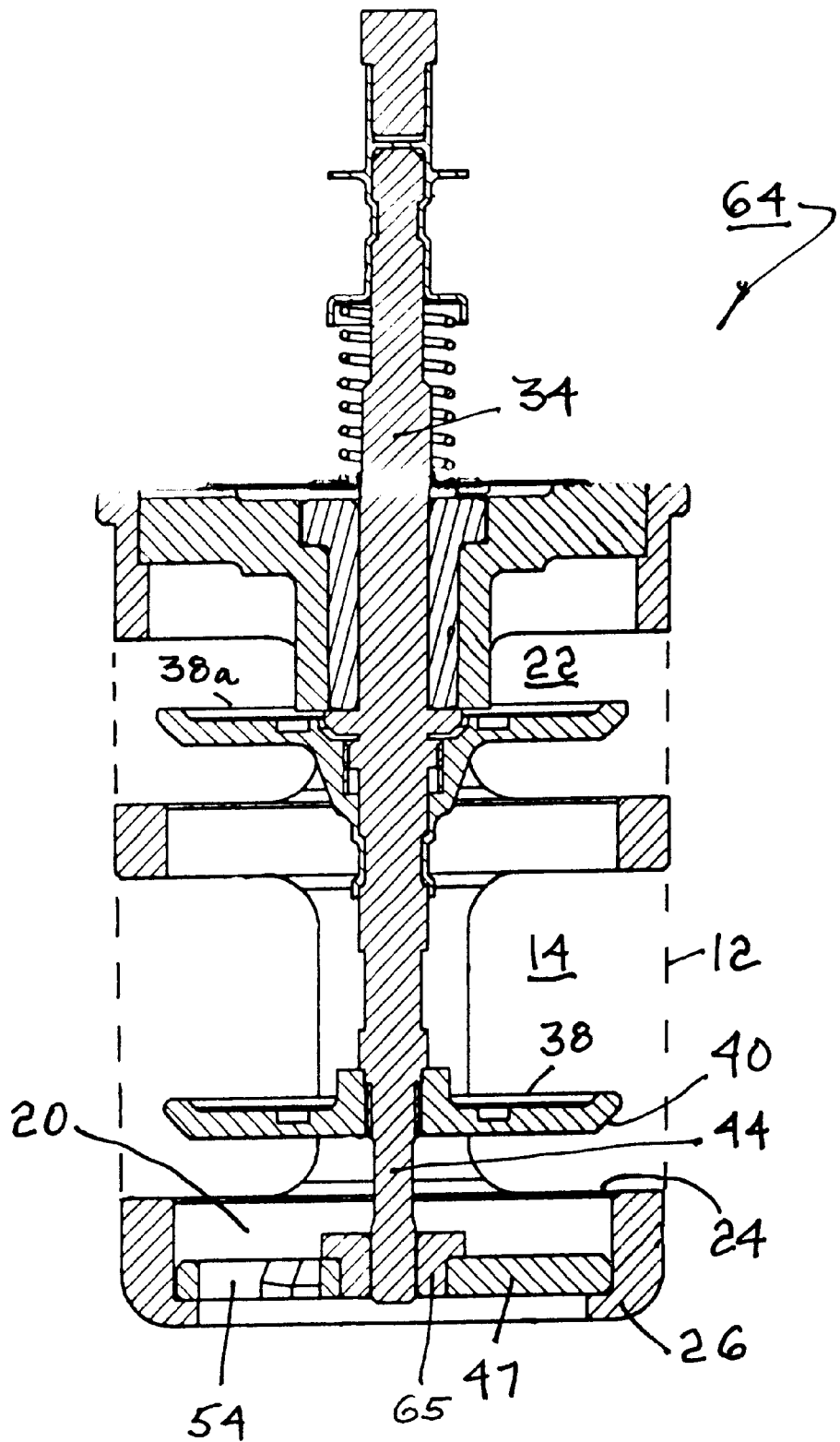
FIG. 9 is a cross-sectional elevational view of a dual-headed poppet valve having a shaft with variable compliance to a bushing, showing the valve in the open position with the shaft radially non-compliant in the bushing substantially as shown in schematic drawing FIG. 7.

Referring to FIG. 9, a dual-headed valve 64 is shown embodying a shaft having variable compliance to a bushing in accordance with the invention. In embodiment 64, both chambers 14 and 22 are provided with valve heads 38,38a, respectively, disposed on pintle shaft 34. The arrangement of the lower portion of the valve including head 38 is substantially as shown and discussed regarding FIGS. 7 and 8.

Figure 12:
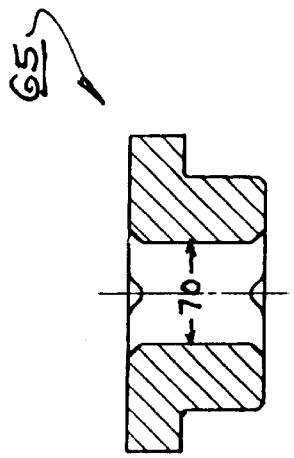
FIG. 12 is a plan view of the bearing shown in FIG. 11.
Figure 11:
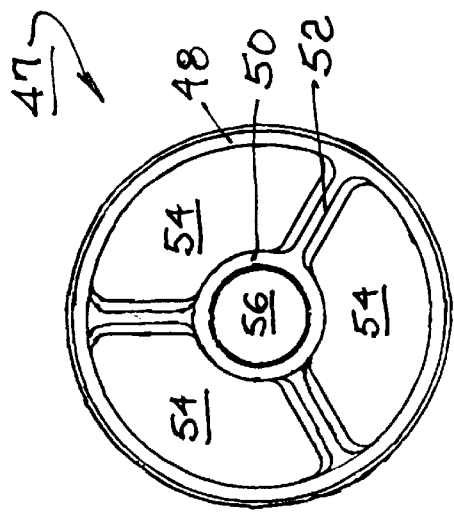
FIG. 11 is an isometric view of a secondary shaft bearing in accordance with the invention for use in the holder shown in FIG. 10.
Figure 13:
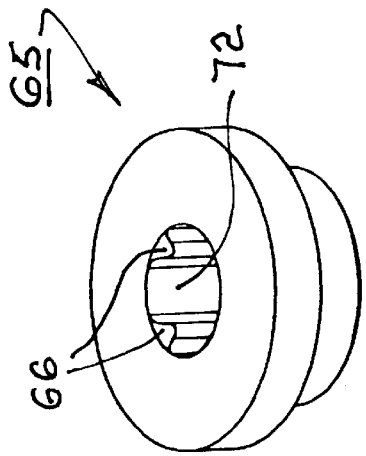
FIG. 13 is a cross-sectional view of the bearing shown in FIGS. 11 and 12, taken along line 13—13 in FIG. 12.

Referring to FIGS. 11 through 13, a novel shaft extension bushing 65 is provided with a plurality of longitudinal ribs 66 disposed along the walls of axial bore 68. The effective or supportive diameter 70 of bore 68 is defined by the peaks of ribs 66. In some applications of the invention, for example, in an exhaust gas recirculation valve for an internal combustion engine, the shaft extension bushing may be readily fouled by buildup of deposits from the gases passing through the valve. The longitudinal valleys 72 between ribs 66 provide convenient and effective conduits for any such deposits to exit the bushing; thus, bushing 65 tends to be self-cleaning and an improvement over prior art smooth-bore bushings in such applications.

It will be apparent to one of ordinary skill in the art that a shaft having variable compliance to a bushing, as illustrated and described herein, and many of its features, could take various forms as applied to other applications and the like. While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for facilitating proper seating and self-centering of a head of a valve shaft in a valve seat, said head being disposed on a first end of said valve shaft, a second end of said valve shaft being received within a first axial bore in a primary bushing, said valve shaft being axially reciprocable between an open and a closed position, said system comprising:

a second bushing having a second axial bore, said second axial bore having a second bore diameter, said second axial bore being disposed substantially concentric relative to said first axial bore; and said valve shaft having a first portion and a second portion, said first portion having a first portion diameter, said second portion having a second portion diameter, said first portion diameter being a predetermined amount less than said second bore diameter, said second portion diameter being substantially equal to said second bore diameter, at least part of said first portion being received within said second axial bore when said valve shaft is in said closed position, at least part of said second portion being received within said second axial bore when said valve shaft is in said open position.

2. A poppet valve, comprising:

a valve body having a chamber therein;

a port formed in a wall of said chamber;

a valve seat formed in said port;

a primary bushing disposed in said valve body, a first axial bore having a first bore diameter defined by said primary bushing;

a second bushing, a second axial bore having a second bore diameter defined by said second bushing, said second bushing disposed in said valve body such that said first and second axial bores are substantially concentric relative to each other; and a pintle shaft being axially reciprocable between an open and a closed position, said pintle shaft having first and second ends, said first end having a first end diameter that is substantially equal to said first bore diameter, said first end being received and reciprocable within said first bore, said second end having a first portion and a second portion, said first portion having a first portion diameter that is a predetermined amount less than said second bore diameter, said second portion having a second portion diameter that is substantially equal to said second bore diameter, at least part of said first portion being received within said second bore when said pintle shaft is in said closed position, at least part of said second portion being received within said second bore when said pintle shaft is in said open position.

3. A poppet valve in accordance with claim 2, further comprising a bushing support for supporting said second bushing.

4. A poppet valve in accordance with claim 2, wherein said second bushing includes a plurality of longitudinal ribs formed on an inside surface of said second bore.

5. A poppet valve in accordance with claim 2, wherein said first portion of said pintle shaft is disposed between said primary bushing and said valve head.

6. A poppet valve in accordance with claim 5, wherein said first portion has the general shape of an hour glass.

7. A poppet valve in accordance with claim 2, wherein said valve head is disposed between said primary bushing and said first portion of said pintle shaft.

8. A poppet valve in accordance with claim 7, wherein said first portion diameter increases in a direction from said second end of said pintle shaft toward said second portion of said shaft.

* * * * *